Mays & Bliss.
Seaming Mach.
No. 87,692. Patented Mar. 9, 1869.

Witnesses
J. B. Coombs
Fred Haynes

Inventors
J. Mays
E. W. Bliss
per Brown Coombs & Co.

UNITED STATES PATENT OFFICE.

JOHN MAYS AND E. W. BLISS, OF BROOKLYN, N. Y., ASSIGNORS TO DEVOE AND PRATT MANUFACTURING COMPANY, OF NEW YORK CITY.

IMPROVEMENT IN SHEET-METAL-SEAMING MACHINES.

Specification forming part of Letters Patent No. 87,692, dated March 9, 1869.

*To all whom it may concern:*

Be it known that we, JOHN MAYS and ELIPHALET W. BLISS, of Brooklyn, in the county of Kings and State of New York, have invented a new and useful Press for Closing Sheet-Metal Seams; and we do hereby declare that the following is a full, clear, and exact description of the same, reference being had to the accompanying drawings, forming a part of this specification.

This invention is designed more especially for the closing of the seams of petroleum-cans, but is also applicable to all sheet-metal seams which stand at right angles to the surface of the article upon which they are formed.

Its object is to provide for the more effectual and convenient closing and securing of said seams preparatory to the soldering operation; and it consists in a novel combination of hinged jaws and platen, whereby a simple, convenient, and efficient press for said purpose is obtained.

It furthermore consists in providing the inner face of one of the jaws with small punches and the opposite face of the other jaw with corresponding recesses, whereby small indentations may be formed in the seam during the pressing operation, for the purpose of preventing longitudinal movement or disarrangement of the parts before or during the soldering operation and of giving additional strength to the joint when soldered.

Figure 1:
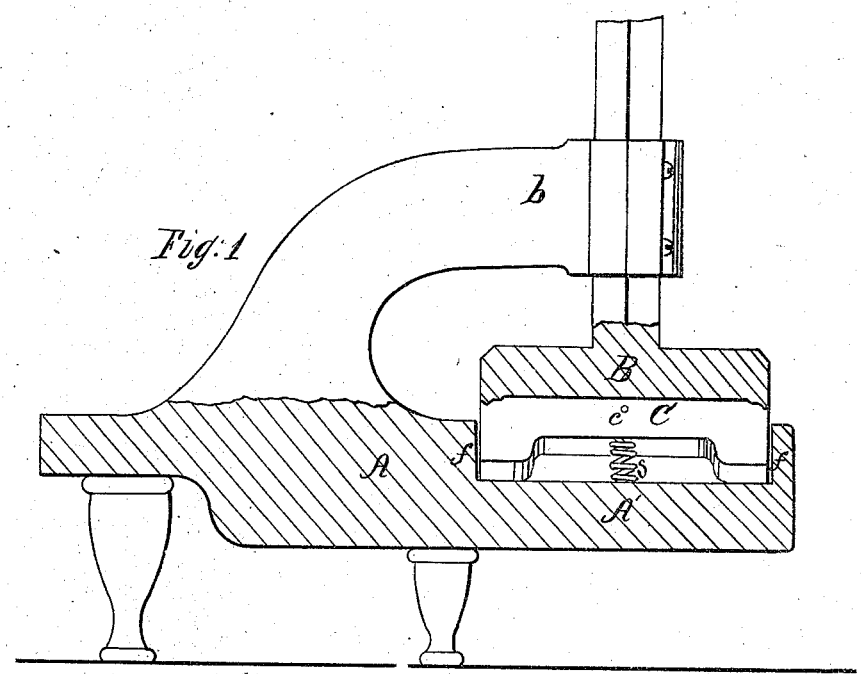
Figure 2:
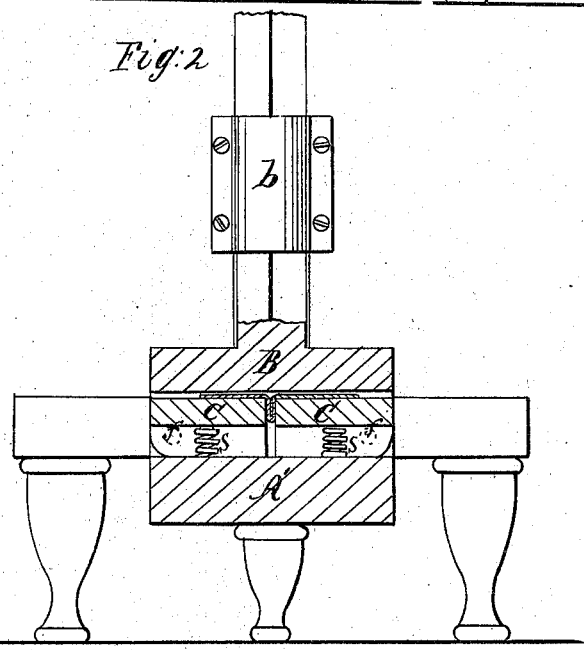
Figure 3:
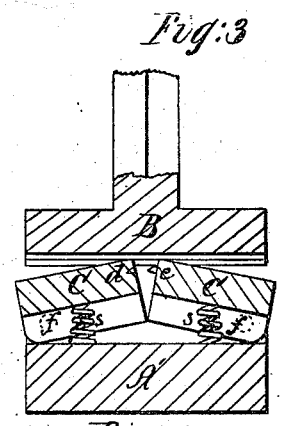

Referring to the accompanying drawings, Figure 1 represents a longitudinal section of a press for closing sheet-metal seams constructed according to our invention. Fig. 2 represents a transverse sectional view of the same, showing the position of the jaws and platen while retaining a seam under compression; and Fig. 3 represents a similar sectional view, showing the jaws and platen in their natural position when not in use; and Fig. 4 is a diagram showing the character of seam or joint to which the invention is applicable.

Similar letters of reference indicate corresponding parts in the several figures.

A A' is the bed-plate of the press, having its portion A' suitably formed and arranged for the slipping over of the can or other article having seams that require to be pressed. Upon the upper side of this portion A' are provided hinged jaws C C. Said jaws C C are constructed of steel or other metal, and are arranged side by side in a horizontal manner, with their inner edges nearly meeting each other, while their outer edges are pivoted at each end to the bed-plate by means of pins $ff$, projecting from their ends and entering bearings provided for them in the bed-plate; or they may be hinged or pivoted by any other suitable means, so as to allow for the upward opening or separating of said jaws at their inner edges. Springs $s$ $s$ are arranged under the said jaws for the purpose of forcing them upward and keeping them apart when not being acted upon by a stronger downward force. Directly over the jaws C C is arranged a platen, B, its stem supported within a guideway in the extremity of a goose-neck, $b$, projecting from the frame, so that its downward movement will act upon the jaws in such manner as to close them. The jaws when closed down do not exactly touch each other, but leave a narrow space between them barely sufficient for containing three thicknesses of the sheet metal of which the can or other article is formed, that being the number of thicknesses required to form the seam, which seam is made to occupy said space during the pressing operation. Upon the inner edge or surface of one of the jaws are provided one or more small punches, $c$, while at a corresponding point or points in the inner face of the opposite jaw are made a corresponding number of recesses, $d$, whereby small indentations are formed during the pressing operation in the several thicknesses of metal composing the seams, for the purpose of preventing longitudinal slipping or disarrangement of the parts before or during the soldering operation and of giving additional strength to the joint when soldered.

Figure 4:

In the operation of this invention the platen is raised, and the sheets of metal, their edges having been previously bent and adjusted in the manner as represented in the diagram, Fig. 4, are inserted between the jaws C C and platen B, with their bent edges downward, so as to be received between the inner faces of the jaws C C. After the said sheets of metal, with their seam or joint, have been so adjusted within the press, the platen is brought down by power suitably applied at the top, thereby forcing the inner faces of the jaws downward and toward each other, compressing the seam between them, as represented in Fig. 2. The small punches $c$ are at the same time forced against the side of the seam with sufficient power to cause the yielding of the plates and the receding of the opposite sides thereof into the recesses $d$, thereby indenting the doubled portion of the two plates composing the seam in such manner into or against each other as to prevent their longitudinal movement or slipping of the one within the other.

What we claim as our invention, and desire to have secured by Letters Patent, is—

1. The pivoted jaws C C and platen B, combined and arranged for operating substantially as and for the purposes herein set forth.

2. The combination, with the jaws C C, of the punches $c$ and recesses $d$, substantially as and for the purpose herein set forth.

JOHN MAYS.
E. W. BLISS.

Witnesses:
J. SEAVER PAGE,
J. W. H. LONNEBERRY.